US012579920B2

(12) United States Patent
Joseph et al.

(10) Patent No.: US 12,579,920 B2
(45) Date of Patent: Mar. 17, 2026

(54) ADAPTING A USER INTERFACE RESPONSIVE TO SCREEN SIZE ADJUSTMENT

(71) Applicant: QUALCOMM Incorporated, San Diego, CA (US)

(72) Inventors: Francis Joseph, Thrissur (IN); Shubhobrata Dutta Choudhury, New Delhi (IN)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 18/068,205

(22) Filed: Dec. 19, 2022

(65) Prior Publication Data

US 2024/0203309 A1 Jun. 20, 2024

(51) Int. Cl.
*G09G 3/00* (2006.01)

(52) U.S. Cl.
CPC ..... *G09G 3/035* (2020.08); *G09G 2340/0442* (2013.01); *G09G 2340/045* (2013.01); *G09G 2340/0464* (2013.01); *G09G 2340/12* (2013.01); *G09G 2354/00* (2013.01)

(58) Field of Classification Search
CPC ........... G09G 3/035; G09G 2340/0442; G09G 2340/045; G09G 2340/0464; G09G 2340/12; G09G 2354/00
See application file for complete search history.

(56) References Cited

U.S. PATENT DOCUMENTS 9,043,714 B1 5/2015 Queru
2012/0019722 A1 1/2012 Kwisthout et al.
2014/0267430 A1* 9/2014 Kudo .................... A61B 6/461 345/649
2016/0349971 A1* 12/2016 Chi ........................ G09G 5/373
2020/0020071 A1 1/2020 Frey et al.
2020/0045375 A1 2/2020 Augustus, III et al.
2020/0225848 A1 7/2020 Yoon et al.
(Continued)

FOREIGN PATENT DOCUMENTS

EP 2777501 A1 9/2014
EP 4177740 A1 5/2023
(Continued)

OTHER PUBLICATIONS

International Search Report and Written Opinion—PCT/US2023/078181—ISA/EPO—Feb. 9, 2024.

*Primary Examiner* — Xin Sheng
(74) *Attorney, Agent, or Firm* — Harrity & Harrity LLP/Qualcomm Incorporated

(57) ABSTRACT

In some aspects, a device may present a content element on a display screen that is in a first size configuration, the content element having an aspect ratio. The device may detect adjustment of a physical size of the display screen from the first size configuration having a first display aspect ratio to a second size configuration having a second display aspect ratio different from the first display aspect ratio. The device may present, responsive to adjustment of the physical size of the display screen from the first size configuration to the second size configuration, one or more user interface elements on the display screen in a non-overlapping arrangement with respect to the content element. Numerous other aspects are described.

30 Claims, 11 Drawing Sheets

(56) References Cited

U.S. PATENT DOCUMENTS

2022/0193553 A1 6/2022 Kruse
2022/0246112 A1 * 8/2022 Seo .................... H04N 21/4858
2023/0029563 A1 * 2/2023 Choi ...................... G09G 3/035
2023/0306929 A1 * 9/2023 Luo ....................... G06F 3/0488

FOREIGN PATENT DOCUMENTS

WO WO-2016175915 A1 11/2016
WO WO-2022022575 A1 2/2022

* cited by examiner

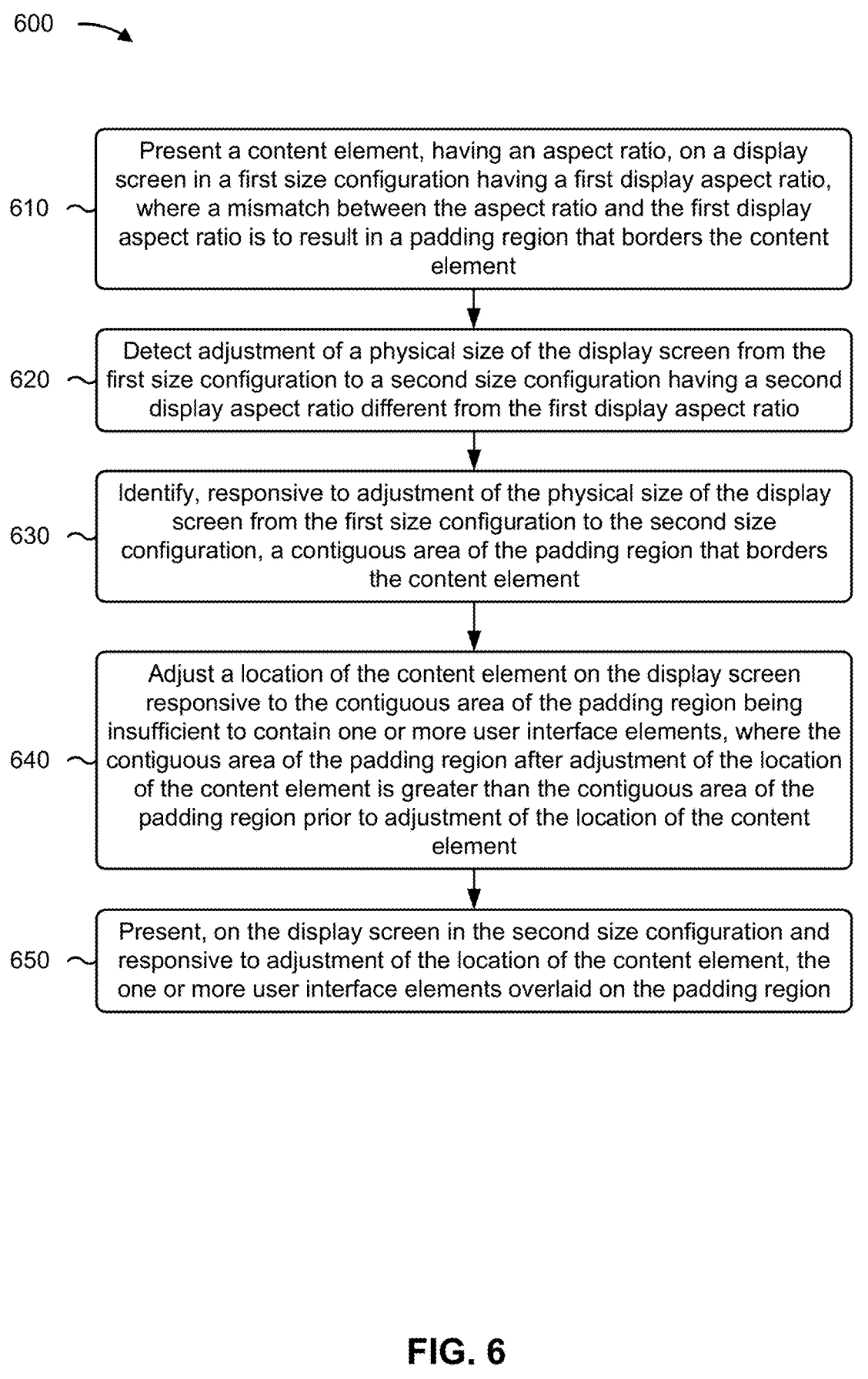

600

610 Present a content element, having an aspect ratio, on a display screen in a first size configuration having a first display aspect ratio, where a mismatch between the aspect ratio and the first display aspect ratio is to result in a padding region that borders the content element 620 Detect adjustment of a physical size of the display screen from the first size configuration to a second size configuration having a second display aspect ratio different from the first display aspect ratio 630 Identify, responsive to adjustment of the physical size of the display screen from the first size configuration to the second size configuration, a contiguous area of the padding region that borders the content element 640 Adjust a location of the content element on the display screen responsive to the contiguous area of the padding region being insufficient to contain one or more user interface elements, where the contiguous area of the padding region after adjustment of the location of the content element is greater than the contiguous area of the padding region prior to adjustment of the location of the content element 650 Present, on the display screen in the second size configuration and responsive to adjustment of the location of the content element, the one or more user interface elements overlaid on the padding region

FIG. 6

ADAPTING A USER INTERFACE RESPONSIVE TO SCREEN SIZE ADJUSTMENT

FIELD OF THE DISCLOSURE

Aspects of the present disclosure generally relate to user interfaces and, for example, to adapting a user interface responsive to screen size adjustment.

BACKGROUND

A display screen of a device may display a user interface (e.g., a graphical user interface). A user interface may permit interactions between a user of the device and the device. In some cases, the user may interact with the user interface to operate and/or control the device to produce a desired result. For example, the user may interact with the user interface of the device to cause the device to perform an action. Additionally, the user interface may provide information to the user.

SUMMARY

Some aspects described herein relate to a method. The method may include presenting, by a device, a content element on a display screen that is in a first size configuration, the content element having an aspect ratio. The method may include detecting, by the device, adjustment of a physical size of the display screen from the first size configuration having a first display aspect ratio to a second size configuration having a second display aspect ratio different from the first display aspect ratio. The method may include presenting, by the device and responsive to adjustment of the physical size of the display screen from the first size configuration to the second size configuration, one or more user interface elements on the display screen in a non-overlapping arrangement with respect to the content element.

Some aspects described herein relate to a system. The system may include one or more memories and one or more processors coupled to the one or more memories. The one or more processors may be configured to present a content element, having an aspect ratio, on a display screen that is in a first size configuration having a first display aspect ratio, wherein a mismatch between the aspect ratio and the first display aspect ratio is to result in a padding region that borders the content element. The one or more processors may be configured to detect adjustment of a physical size of the display screen from the first size configuration to a second size configuration having a second display aspect ratio different from the first display aspect ratio, where adjustment of the physical size of the display screen from the first size configuration to the second size configuration changes a contiguous area of the padding region. The one or more processors may be configured to present, responsive to adjustment of the physical size of the display screen from the first size configuration to the second size configuration, one or more user interface elements on the display screen overlaid on the padding region.

Some aspects described herein relate to a non-transitory computer-readable medium that stores a set of instructions for a device. The set of instructions, when executed by one or more processors of the device, may cause the device to present a content element, having an aspect ratio, on a display screen in a first size configuration having a first display aspect ratio, where a mismatch between the aspect ratio and the first display aspect ratio is to result in a padding region that borders the content element. The set of instructions, when executed by one or more processors of the device, may cause the device to detect adjustment of a physical size of the display screen from the first size configuration to a second size configuration having a second display aspect ratio different from the first display aspect ratio. The set of instructions, when executed by one or more processors of the device, may cause the device to identify, responsive to adjustment of the physical size of the display screen from the first size configuration to the second size configuration, a contiguous area of the padding region that borders the content element. The set of instructions, when executed by one or more processors of the device, may cause the device to adjust a location of the content element on the display screen responsive to the contiguous area of the padding region being insufficient to contain one or more user interface elements, where the contiguous area of the padding region after adjustment of the location of the content element is greater than the contiguous area of the padding region prior to adjustment of the location of the content element. The set of instructions, when executed by one or more processors of the device, may cause the device to present, on the display screen in the second size configuration and responsive to adjustment of the location of the content element, the one or more user interface elements overlaid on the padding region.

Some aspects described herein relate to an apparatus. The apparatus may include means for presenting, on a display screen in a first size configuration, a content element in a full screen mode, where a padding region borders the content element in the full screen mode. The apparatus may include means for detecting adjustment of a physical size of the display screen from the first size configuration to a second size configuration, where adjustment of the physical size of the display screen from the first size configuration to the second size configuration changes a contiguous area of the padding region. The apparatus may include means for presenting, on the display screen in the second size configuration and responsive to adjustment of the physical size of the display screen from the first size configuration to the second size configuration, one or more user interface elements overlaid on the padding region.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a flowchart of an example process associated with adapting a user interface responsive to screen size adjustment.

DETAILED DESCRIPTION

Figure 1:
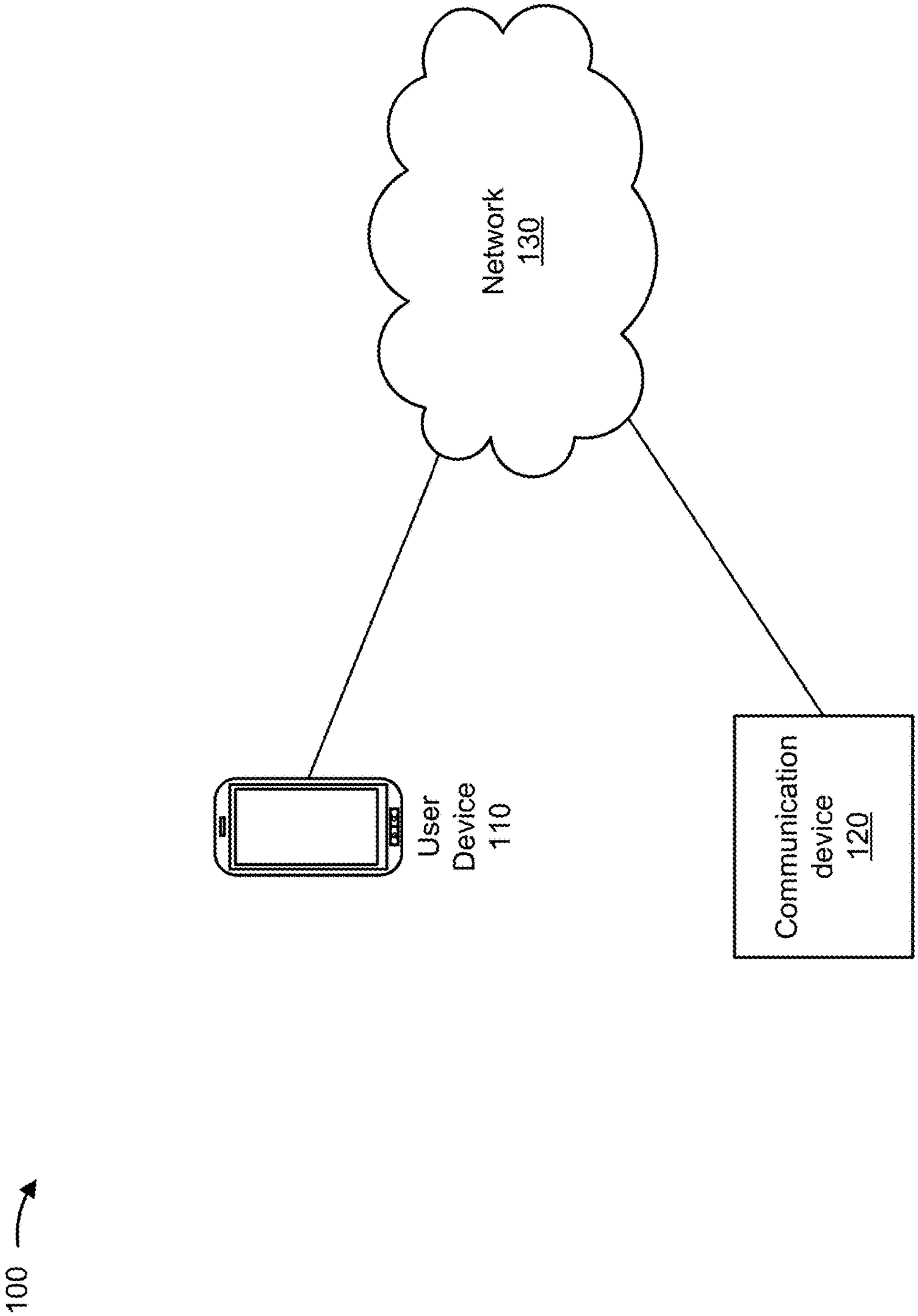
FIG. 1 is a diagram of an example environment in which systems and/or methods described herein may be implemented.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A device, such as a user device, may present a user interface on a display screen of the device. In some examples, a content element (e.g., that includes multimedia content, such as video content) may be presented in the user interface. Common aspect ratios for a content element may include a 16:9 aspect ratio, a 1:1 aspect ratio, a 4:3 aspect ratio, a 4:5 aspect ratio, a 21:9 aspect ratio, a 9:16 aspect ratio, a 2.4:1 aspect ratio, or a 2:3 aspect ratio, among other examples. Due to these multiple different aspect ratios, an aspect ratio of a content element sometimes may be mismatched with an aspect ratio of the display screen (e.g., which may have a 16:9 aspect ratio). In such cases, the device may zoom in on the content element, thereby changing the aspect ratio of the content element, so that the content element fills the display screen. This may result in cropping and loss of data at edges of the content element. In some other cases, the device may leave the aspect ratio of the content element intact, and the device may add padding that borders the content element to thereby fill the display screen. Here, useful display screen space is wasted.

Some display screens may be configured to allow adjustment of a physical size of the display screen. For example, a rollable display may be rolled or unrolled to thereby contract or expand the physical size of the rollable display. In the case of an adjustable display screen, the issue of padding wasting useful display screen space may be exacerbated when the physical size of the display screen is changed. For example, increasing the physical size of the display screen may increase the padding that borders the content element.

Some aspects described herein provide efficient utilization of padding that borders a content element presented on a display screen. In some aspects, a physical size of the display screen may be adjustable by a user (e.g., the display screen may be a rollable display, a foldable display, or the like). In some aspects, responsive to adjustment of the physical size of the display screen, one or more user interface elements may be presented on the display screen overlaid on a padding region that borders a content element. For example, an aspect ratio of the content element may differ from an aspect ratio of the display, thereby resulting in a region of the display that is unoccupied by the content element, which may be referred to as the padding region. Adjustment of the physical size of the display screen may change (e.g., increase or decrease) the size of the padding region, and a configuration of the user interface elements overlaid on the padding region may be responsive to the change to the size of the padding region. In this way, a user interface of the display screen may be adapted responsive to adjustment of the physical size of the display screen. Accordingly, the user interface may be improved, thereby improving a usability of the device, a user-friendliness of the device, an efficiency of the device, a performance of the device, or the like.

FIG. 1 is a diagram of an example environment 100 in which systems and/or methods described herein may be implemented. As shown in FIG. 1, environment 100 may include a user device 110, a communication device 120, and a network 130. Devices of environment 100 may interconnect via wired connections, wireless connections, or a combination of wired and wireless connections.

The user device 110 may include one or more devices capable of receiving, generating, storing, processing, and/or providing information associated with adapting a user interface responsive to screen size adjustment, as described elsewhere herein. The user device 110 may include a communication device and/or a computing device. For example, the user device 110 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The communication device 120 may include one or more devices capable of receiving, generating, storing, processing, providing, and/or routing information associated with content for a content element, as described elsewhere herein. The communication device 120 may include a communication device and/or a computing device. For example, the communication device 120 may include a server, such as an application server, a client server, a web server, a database server, a host server, a proxy server, a virtual server (e.g., executing on computing hardware), or a server in a cloud computing system. In some aspects, the communication device 120 may include computing hardware used in a cloud computing environment.

The network 130 may include one or more wired and/or wireless networks. For example, the network 130 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 130 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
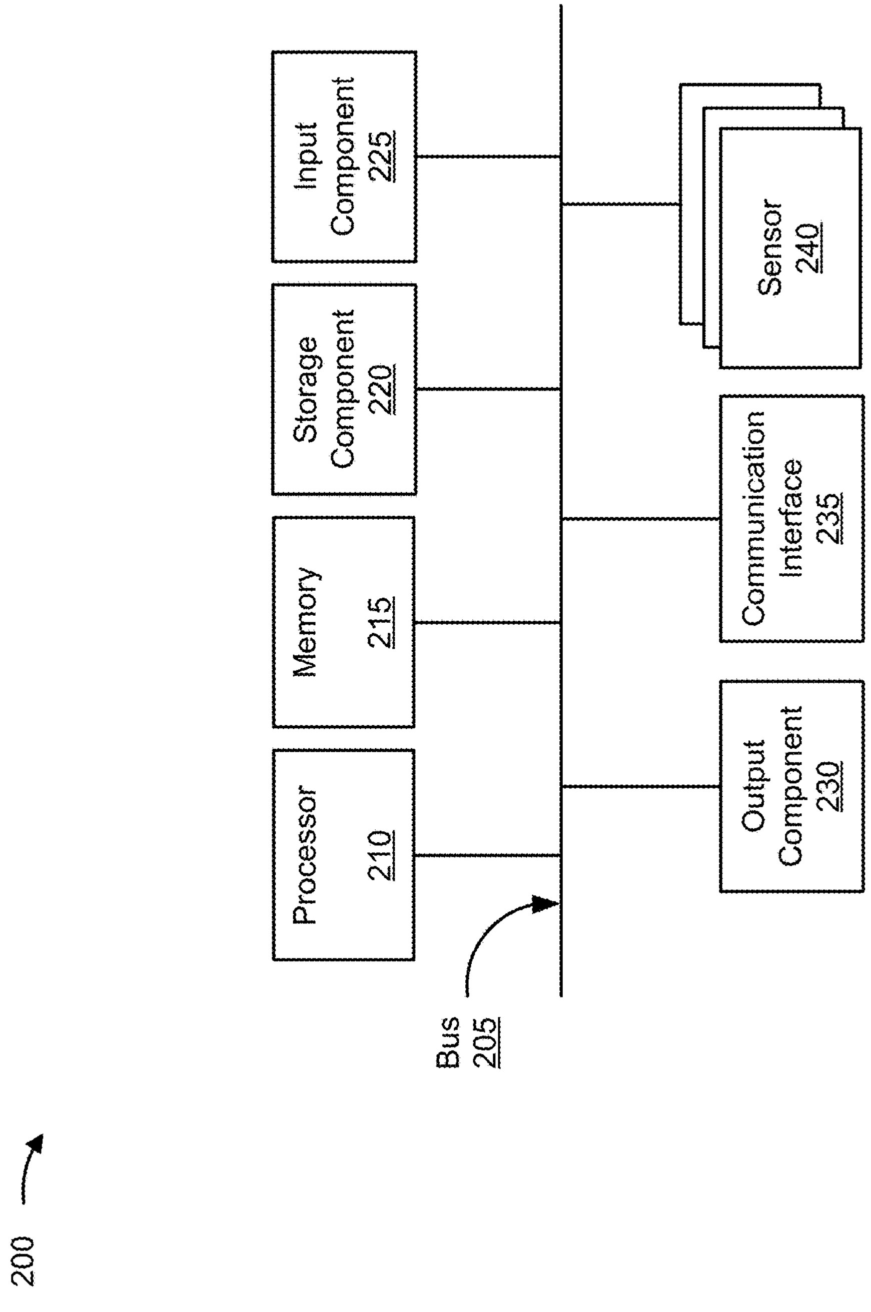
FIG. 2 is a diagram illustrating example components of a device, in accordance with the present disclosure.

FIG. 2 is a diagram illustrating example components of a device 200, in accordance with the present disclosure. Device 200 may correspond to user device 110 and/or communication device 120. In some aspects, user device 110 and/or communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, and/or one or more sensors 240.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Sensor 240 includes one or more devices capable of detecting a characteristic associated with device 200 (e.g., a characteristic relating to a physical environment of the device 200 or a characteristic relating to a condition of the device 200). Sensor 240 may include one or more photodetectors (e.g., one or more photodiodes), one or more cameras, one or more microphones, one or more gyroscopes (e.g., a micro-electro-mechanical system (MEMS) gyroscope), one or more magnetometers, one or more accelerometers, one or more location sensors (e.g., a global positioning system (GPS) receiver or a local position system (LPS) device), one or more motion sensors, one or more temperature sensors, one or more pressure sensors, and/or one or more touch sensors, among other examples. In some aspects, sensor 240 may include a device configured to detect a physical size of a display screen of device 200.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for presenting a content element on a display screen that is in a first size configuration, the content element having an aspect ratio; means for detecting adjustment of a physical size of the display screen from the first size configuration having a first display aspect ratio to a second size configuration having a second display aspect ratio different from the first display aspect ratio; means for presenting, responsive to adjustment of the physical size of the display screen from the first size configuration to the second size configuration, one or more user interface elements on the display screen in a non-overlapping arrangement with respect to the content element; or the like. Additionally, or alternatively, device 200 may include means for presenting a content element, having an aspect ratio, on a display screen that is in a first size configuration having a first display aspect ratio, where a mismatch between the aspect ratio and the first display aspect ratio is to result in a padding region that borders the content element; means for detecting adjustment of a physical size of the display screen from the first size configuration to a second size configuration having a second display aspect ratio different from the first display aspect ratio, where adjustment of the physical size of the display screen from the first size configuration to the second size configuration changes a contiguous area of the padding region; means for presenting, responsive to adjustment of the physical size of the display screen from the first size configuration to the second size configuration, one or more user interface elements on the display screen overlaid on the padding region; or the like. Additionally, or alternatively, device 200 may include means for presenting a content element, having an aspect ratio, on a display screen in a first size configuration having a first display aspect ratio, where a mismatch between the aspect ratio and the first display aspect ratio is to result in a padding region that borders the content element; means for detecting adjustment of a physical size of the display screen from the first size configuration to a second size configuration having a second display aspect ratio different from the first display aspect ratio; means for identifying, responsive to adjustment of the physical size of the display screen from the first size configuration to the second size configuration, a contiguous area of the padding region that borders the content element; means for adjusting a location of the content element on the display screen responsive to the contiguous area of the padding region being insufficient to contain one or more user interface elements, where the contiguous area of the padding region after adjustment of the location of the content element is greater than the contiguous area of the padding region prior to adjustment of the location of the content element; means for presenting, on the display screen in the second size configuration and responsive to adjustment of the location of the content element, the one or more user interface elements overlaid on the padding region; or the like. Additionally, or alternatively, device 200 may include means for presenting, on a display screen in a first size configuration, a content element in a full screen mode, where a padding region borders the content element in the full screen mode; means for detecting adjustment of a physical size of the display screen from the first size configuration to a second size configuration, where adjustment of the physical size of the display screen from the first size configuration to the second size configuration changes a contiguous area of the padding region; means for presenting, on the display screen in the second size configuration and responsive to adjustment of the physical size of the display screen from the first size configuration to the second size configuration, one or more user interface elements overlaid on the padding region; or the like. In some aspects, such means may include one or more components of device 200 described in connection with FIG. 2, such as bus 205, processor 210, memory 215, storage component 220, input component 225, output component 230, communication interface 235, and/or sensor(s) 240.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

FIGS. 3A-3E are diagrams illustrating an example 300 associated with adapting a user interface responsive to screen size adjustment, in accordance with the present disclosure. As shown in FIGS. 3A-3E, example 300 includes a device, such as a user device. The device may include a display screen (e.g., a liquid crystal display (LCD) display screen, a light emitting diode (LED) display screen, an organic light emitting diode (OLED) display screen, or the like). In some aspects, a physical size (e.g., a physical screen area) of the display screen may be adjustable, such that the display screen may be adjusted into various size configurations according to a preference of a user of the device. That is, the physical area of the display screen may be adjustable by enlarging or shrinking the physical display along at least one dimension, such that an aspect ratio of the display screen changes. For example, the display screen may be a rollable display (e.g., a rollable OLED display) configured for adjustment of the physical size of the display screen. As an example, the rollable display may be configured to be rolled or unrolled to expand or contract the physical size of the display screen. As another example, the display screen may be a foldable display configured to be unfolded or folded to expand or contract the physical size of the display screen. The device may cause the display screen to display a user interface (e.g., a graphical user interface) that includes user interface elements and/or content elements, as described herein.

Figure 3A:
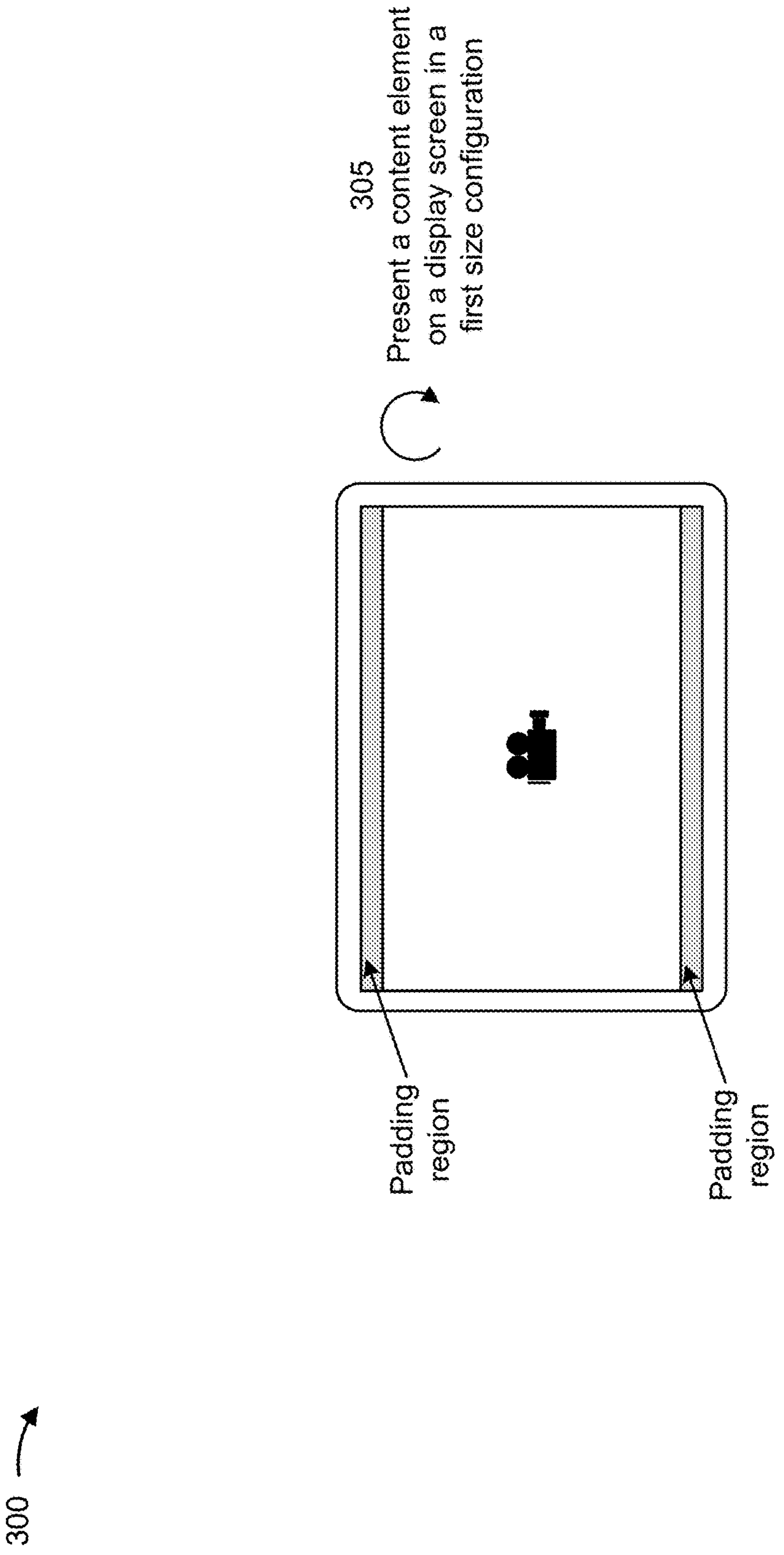
FIGS. 3A-3E are diagrams illustrating an example associated with adapting a user interface responsive to screen size adjustment, in accordance with the present disclosure.

As shown in FIG. 3A, and by reference number 305, the device may present a content element on the display screen (e.g., in the user interface of the display screen), and the physical size of the display screen may be in a first size configuration (e.g., as selected by a user of the device). The content element may have an aspect ratio, and the display screen in the first size configuration may have a first display aspect ratio. The content element may include image content, video content, augmented reality (AR) content, game content, or the like. In some aspects, the device may present the content element in a full screen mode on the display screen. In the full screen mode, the content element may occupy a maximum area of the display screen as permitted by the aspect ratio of the content element and the display aspect ratio of the display screen.

In cases where the aspect ratio of the content element and the aspect ratio of the display screen are mismatched, padding regions (e.g., black, gray, white, or the like, strips unused by the content element) may be presented on the display screen with the content element. For example, a padding region may border the content element (e.g., when the content element is in the full screen mode). Specifically, a padding region and an additional padding region (e.g., which are non-contiguous with each other) may border opposite edges (e.g., above and below the content element, or to the left and to the right of the content element), respectively, of the content element in the first size configuration of the display screen. A padding region may be a region of the display screen that is unoccupied by the content element due to a mismatch between the aspect ratio of the content element and the aspect ratio of the display screen. As described herein, the padding region may contain content.

In some aspects, an orientation of the display screen (e.g., portrait mode or landscape mode) may affect which opposite edges of the content element are bordered by the padding regions. The padding regions bordering opposite edges of the content element may be equally sized (e.g., may each have the same area). In some cases, a size of the display screen may be adjusted (e.g., by a user) such that the aspect ratio of the content element matches the aspect ratio of the display screen, and there may be no padding regions bordering the content element. In some other cases, padding regions bordering the content element may be a result of an adjustment of the physical size of the display screen from a starting size configuration to a current size configuration (e.g., the first size configuration).

In some aspects, user interface (UI) elements may be absent from the padding region(s) in the first size configuration of the display screen. That is, the padding region(s) may be blank. In some aspects, one or more UI elements may be overlaid on the padding region(s) in the first size configuration of the display screen. The UI elements may include text (e.g., subtitles, user comments on the content, or the like), a user control (e.g., a video playback control, a volume control, an image editing control, a gaming control, or the like), a text input element (e.g., for submitting a comment, for sending a message, or the like), an interactive element (e.g., an application shortcut, a keyboard shortcut, such as for typing suggestions or emojis, a social media element, such as a "like" element or a "share" element, or the like), or an additional content element.

Figure 3B:
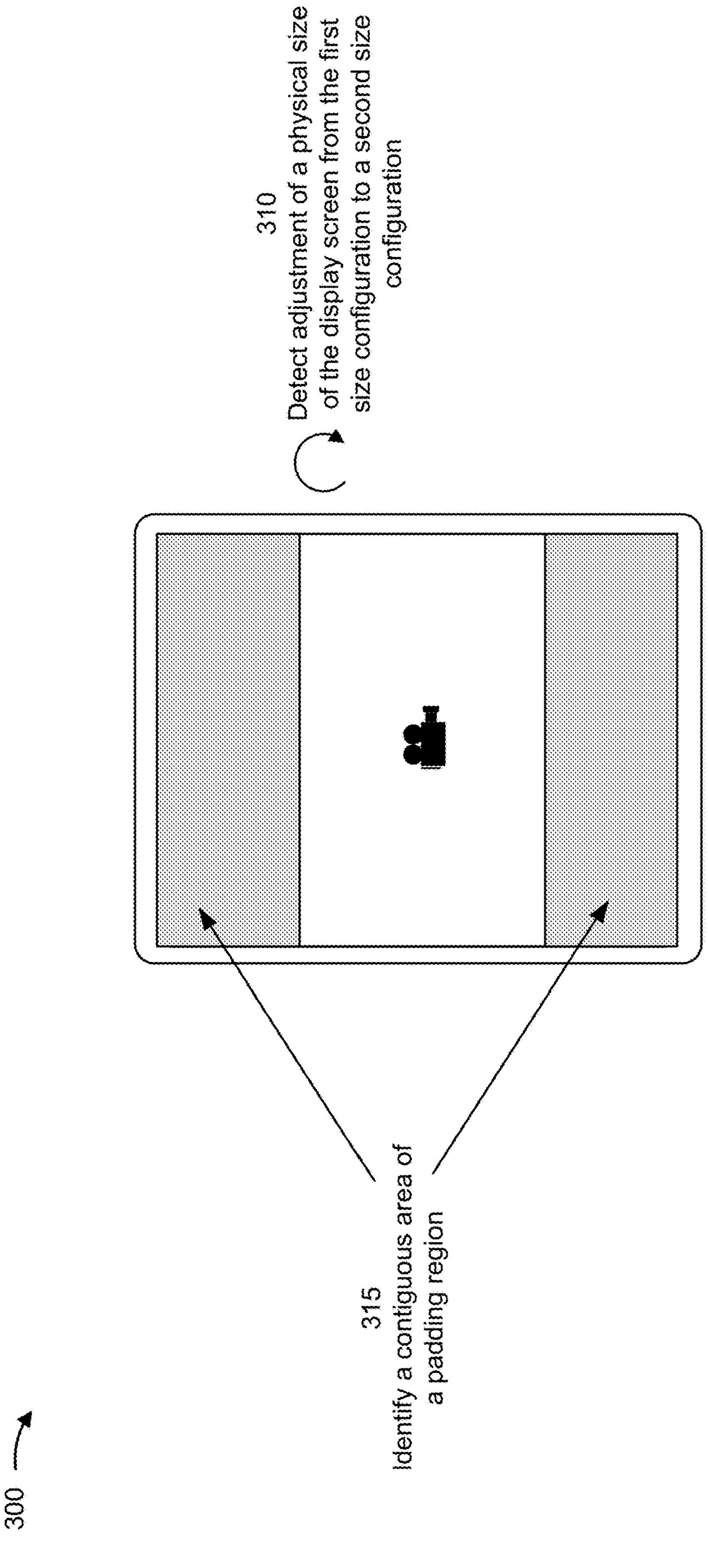

As shown in FIG. 3B, and by reference number 310, the device may detect adjustment of a physical size of the display screen from the first size configuration to a second size configuration having a second display aspect ratio. The adjustment of the physical size of the display screen may cause a change to an area (length×width) or an aspect ratio of the display screen (e.g., rather than merely a change in an orientation of the display screen). That is, the adjustment of the physical size of the display screen may change a dimensional size of the display screen in at least one dimension, rather than merely changing a size of a viewable area of the display screen. For example, in the case of a rollable display, adjustment of the physical size of the display screen may include rolling or unrolling of the rollable display. The device may detect adjustment of the physical size of the display screen while the content element is presented (e.g., in the full screen mode) on the display screen. In some aspects, the physical size of the display screen may be smaller in the first configuration than in the second configuration. In some aspects, the physical size of the display screen may be larger in the first configuration than in the second configuration. In some aspects, the aspect ratio of the display screen in the first size configuration may be different from the aspect ratio of the display screen in the second size configuration.

In some aspects, adjustment of the physical size of the display screen from the first size configuration to the second size configuration may result in a change to a contiguous area (length×width) of a padding region (e.g., which may exclude notches, punch holes, or the like, of the display screen), where the padding region is a region of the display screen that is unoccupied by the content element due to a mismatch between the aspect ratio of the content element and the aspect ratio of the display screen. For example, adjustment of the physical size of the display screen from the first size configuration to the second size configuration may result in an increase to a contiguous area of a padding region. As an example, each of the padding regions may increase in area by the same amount (e.g., such that the padding regions remain equally sized). In some aspects, the increase of the area of the padding region(s) may be an increase from an area of zero in the first size configuration (e.g., the padding regions may be absent in the first size configuration). In some aspects, the device may determine that the aspect ratio of the content element and the second display aspect ratio differ, thereby indicating that the padding region is to be present on the display screen.

As shown by reference number 315, the device may identify a contiguous area (e.g., as a length in pixels and a height in pixels, or the like) of a padding region. The device may identify the contiguous area of the padding region responsive to adjustment of the physical size of the display screen from the first size configuration to the second size configuration. The device may identify the contiguous area of the padding region in accordance with the aspect ratio of the content element, the aspect ratio of the display screen, and a total area of the display screen (e.g., in the second size configuration). For example, these parameters may indicate an area, of the total area of the display screen, that the content element is to occupy, and the padding region may be half of a remaining area of the total area of the display screen (e.g., where an additional padding region is the other half). In some aspects, the contiguous area of the padding region may exclude notches, punch holes, or the like, of the display screen.

Figure 3C:
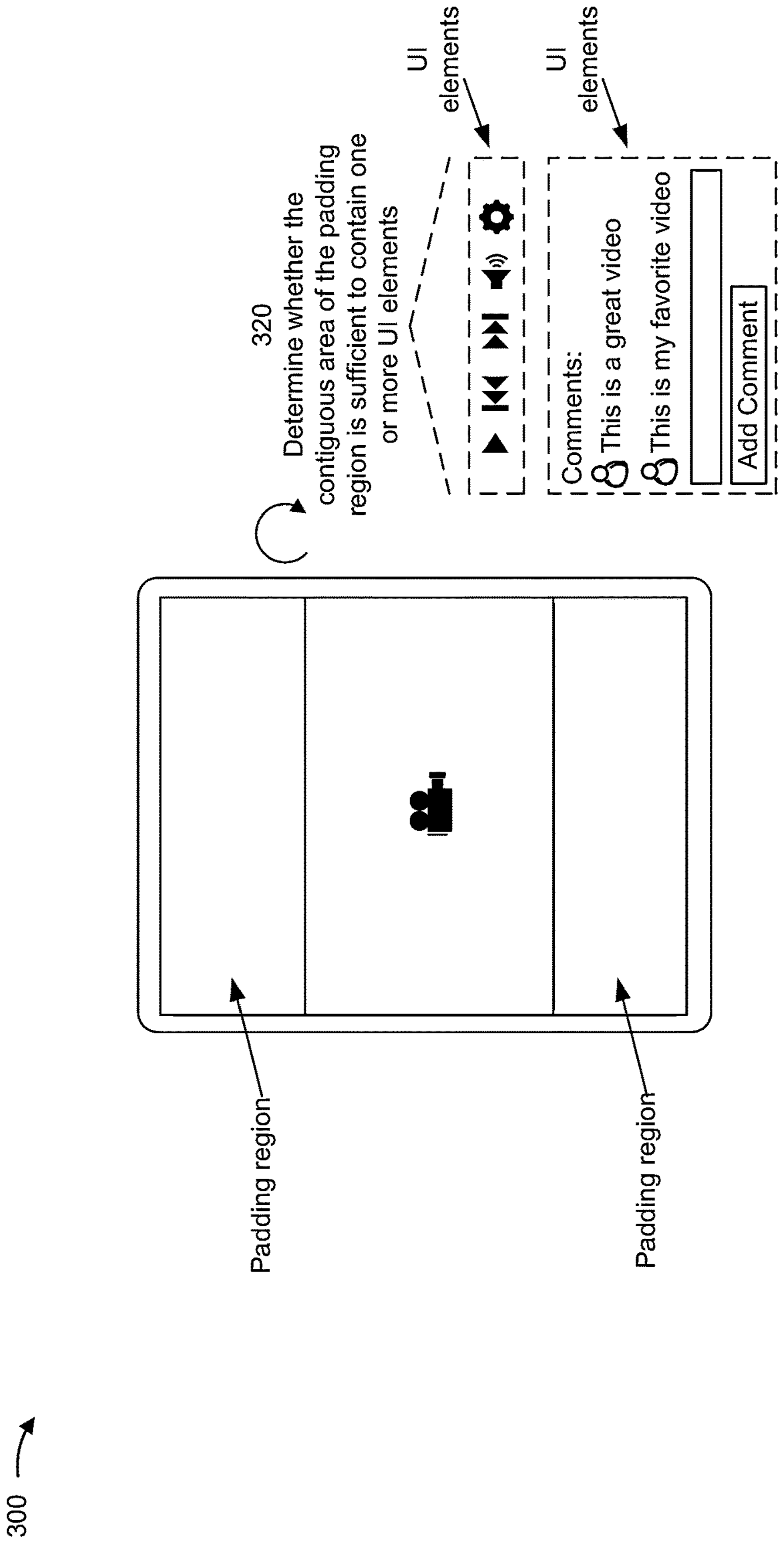

As shown in FIG. 3C, and by reference number 320, the device may determine whether the contiguous area of the padding region is sufficient to contain one or more UI elements (e.g., that are to be presented on the display screen in connection with the content element). The contiguous area of the padding region may be sufficient to contain the UI elements if the UI elements can be overlaid on the padding region without overlapping with the content element. The device may determine whether the contiguous area of the padding region is sufficient to contain the UI elements after identifying the contiguous area of the padding region.

Moreover, the device may identify the UI elements that are to be presented on the display screen in connection with the content element. The UI elements may include default UI elements used in connection with the content element (e.g., as indicated by application settings of an application associated with the content element). Additionally, or alternatively, the UI elements may include user-selected UI elements used in connection with the content element (e.g., as indicated by one or more user settings). Additionally, or alternatively, the UI elements may include device-selected UI elements, which the device may determine (e.g., using a machine learning model) to be used in connection with the content element based at least in part on historical user behavior. Additionally, or alternatively, the UI elements may include one or more UI elements that were presented on the display screen in connection with the content element prior to the content element entering the full screen mode. In some aspects, an application associated with the content element may publish metadata to the device (e.g., to an operating system of the deice) indicating the UI elements that are to be presented on the display screen in connection with the content element. Each of the UI elements may be associated with size information (e.g., in the metadata) indicating an aspect ratio of the UI element and/or an area that the UI element occupies.

Thus, the device may determine whether the contiguous area of the padding region is sufficient to contain the UI elements in accordance with the size information associated with the UI elements. In some aspects, the device may determine whether the contiguous area of the padding region is sufficient to contain the UI elements responsive to adjustment of the physical size of the display screen from the first size configuration to the second size configuration.

In some aspects, the device may determine that the contiguous area of the padding region is sufficient to contain the UI elements, and the device may present the UI elements on the display screen overlaid on the padding region. In some aspects, based on a determination that the contiguous area of the padding region is not sufficient to contain the UI elements, the device may cause scaling down of one or more UI elements, discarding of one or more UI elements, or the like, to facilitate containing the UI elements in the padding region.

Figure 3D:
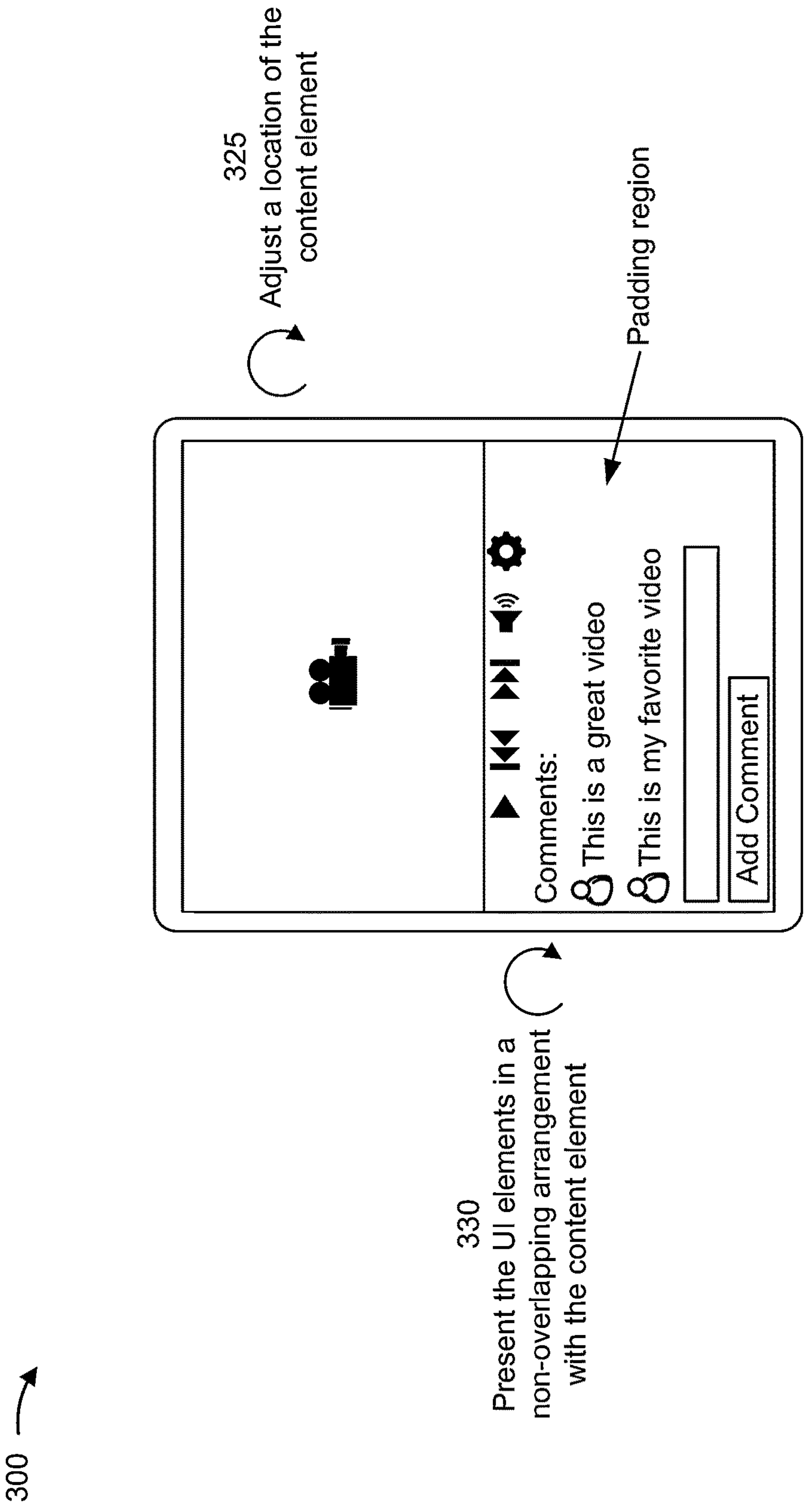

As shown in FIG. 3D, and by reference number 325, the device may adjust a location of the content element on the display screen (e.g., in the user interface of the display screen). In some aspects, the device may adjust the location of the content element responsive to a determination that the contiguous area of the padding region is insufficient to contain the UI elements. In some aspects, the device may adjust the location of the content element responsive to detecting adjustment of the physical size of the display screen from the first size configuration to the second size configuration (e.g., the device may adjust the location of the content element without first determining that the contiguous area of the padding region is insufficient to contain the UI elements).

Conventionally, a content element may be presented on a display screen vertically centered (e.g., when an orientation of the display screen is in a portrait mode) and/or horizontally centered (e.g., when an orientation of the display screen is in a landscape mode), thereby resulting in equally sized padding regions at opposite edges of the content element. In contrast, adjusting the location of the content element on the display screen, as described herein, may position the content element vertically uncentered and/or horizontally uncentered on the display screen, thereby resulting in unequally sized padding regions. In some aspects, the contiguous area of the padding region after adjustment of the location of the content element may be greater than the contiguous area of the padding region prior to adjustment of the location of the content element. For example, prior to adjustment of the location of the content element, the padding region and an additional padding region may border opposite edges of the content element, as described above. Continuing with the example, after adjustment of the location of the content element, the padding region may be a single padding region (e.g., the additional padding region may be eliminated) bordering a single edge of the content element.

In some aspects, in addition to, or as an alternative to, adjusting the location of the content element, the device may adjust a size (e.g., an area) of the content element. For example, the device may adjust a size of the content element to maximize use, by the content element, of an area of the display screen in the second size configuration. As another example, the device may adjust a size of the content element to change the contiguous area of the padding region.

As shown by reference number 330, the device may present the UI elements on the display screen (e.g., that is in the second size configuration) in a non-overlapping arrangement with respect to the content element (e.g., in the user interface of the display screen). In some aspects, the device may present the UI elements on the display screen responsive to adjustment of the physical size of the display screen from the first size configuration to the second size configuration. As described herein, adjustment of the physical size of the display screen from the first size configuration to the second size configuration may change the contiguous area of the padding region. Accordingly, the device may present the UI elements on the display screen (e.g., that is in the second size configuration) overlaid on the padding region (e.g., the padding region that changed in area by adjustment of the physical size of the display screen from the first size configuration to the second size configuration).

Additionally, or alternatively, the device may present the UI elements on the display screen responsive to adjustment of the location of the content element. As described herein, adjustment of the location of the content element may increase the contiguous area of the padding region. Accordingly, the device may present the UI elements on the display screen (e.g., that is in the second size configuration) in a non-overlapping arrangement with respect to the adjusted location of the content element. Specifically, the device may present the UI elements on the display screen (e.g., that is in the second size configuration) overlaid on the padding region with respect to the adjusted location of the content element (e.g., the padding region that is increased by adjustment of the location of the content element). Additionally, or alternatively, the device may present the UI elements on the display screen responsive to determining that the aspect ratio of the content element differs from the second display aspect ratio of the display screen in the second size configuration. Additionally, or alternatively, the device may present the UI elements on the display screen responsive to one or more user preferences. For example, the device may retrieve one or more user preference settings (e.g., indicating which UI elements are to be displayed, a quantity of UI elements that are to be displayed, a size for display UI elements, or the like), and the device may present the UI elements in accordance with the user preference settings.

In some aspects, a configuration of UI elements in the padding region in the first size configuration of the display screen may be different from a configuration of the UI elements overlaid on the padding region in the second size configuration of the display. For example, in connection with adjustment of the display screen from the first size configuration to the second size configuration, the device may adjust the configuration of the UI elements in the padding region. Additionally, or alternatively, a configuration of UI elements in the padding region prior to adjustment of the location of the content element may be different from a configuration of UI elements in the padding region after adjustment of the location of the content element. For example, in connection with adjustment of the location of the content element, the device may adjust the configuration of the UI elements in the padding region. The configuration of the UI elements may be in accordance with (e.g., a function of) the contiguous area of the padding region. That is, as the contiguous area of the padding region changes (e.g., due to adjustment of the physical size of the display screen and/or adjustment of the location of the content element), the configuration of the UI elements may also change.

The configuration of the UI elements may relate to a quantity of the UI elements, a size of the UI elements, a location of the UI elements on the display screen, and/or an arrangement of the UI elements with respect to each other (e.g., an order in which the UI elements are displayed), among other examples. For example, in connection with adjustment of the display screen from the first size configuration to the second size configuration and/or adjustment of the location of the content element, the device may eliminate one or more UI elements, add one or more UI elements, scale up one or more UI elements, scale down one or more UI elements, move one or more UI elements, or the like. As an example, a quantity of UI elements that are overlaid on the padding region may be in accordance with (e.g., a function of) the contiguous area of the padding region.

In some aspects, to present the UI elements in a non-overlapping arrangement with respect to the content element (e.g., to overlay the UI elements on the padding region), the device may present the UI elements in an arrangement that is in accordance with one or more characteristics of a user of the device (e.g., a dominant hand of the user, a hand size of the user, an age of the user, a vision impairment of the user, or the like) and/or one or more preferences of the user of the device (e.g., UI element display preferences, UI element hiding preferences, or the like). For example, the device may overlay the UI elements in an arrangement that is in accordance with a dominant hand of the user (e.g., which the user may indicate in a setting of an operating system of the device and/or in an application of the device). As an example, if the user is right-handed, then the device may overlay the UI elements on the padding region according to a left side alignment (e.g., thereby reducing a probability that the user will inadvertently interact with a UI element when holding the device in the user's right hand). Moreover, in this example, touch interactions may be disabled for the right side of the display screen. In some aspects, the device may present the UI elements with respect to an orientation of the display screen (e.g., a configuration of the UI elements may be with respect to the orientation of the display screen).

In some aspects, after presenting the UI elements on the padding region, the device may detect further adjustment of the physical size of the display screen from the second size configuration to a third size configuration having a third display aspect ratio. Responsive to adjustment of the physical size of the display screen from the second size configuration to the third size configuration, the device may adjust a configuration, as described herein, of the UI elements (e.g., in accordance with the contiguous area of the padding region in the third size configuration). For example, adjustment of the physical size of the display screen from the second size configuration to a third size configuration may decrease the contiguous area of the padding region and the device may eliminate one or more UI elements, may increase the contiguous area of the padding region and the device may add one or more UI elements, or the like. Additionally, or alternatively, responsive to adjustment of the physical size of the display screen from the second size configuration to the third size configuration, the device may adjust the location of the content element (e.g., to increase the contiguous area of the padding region), as described herein.

Figure 3E:
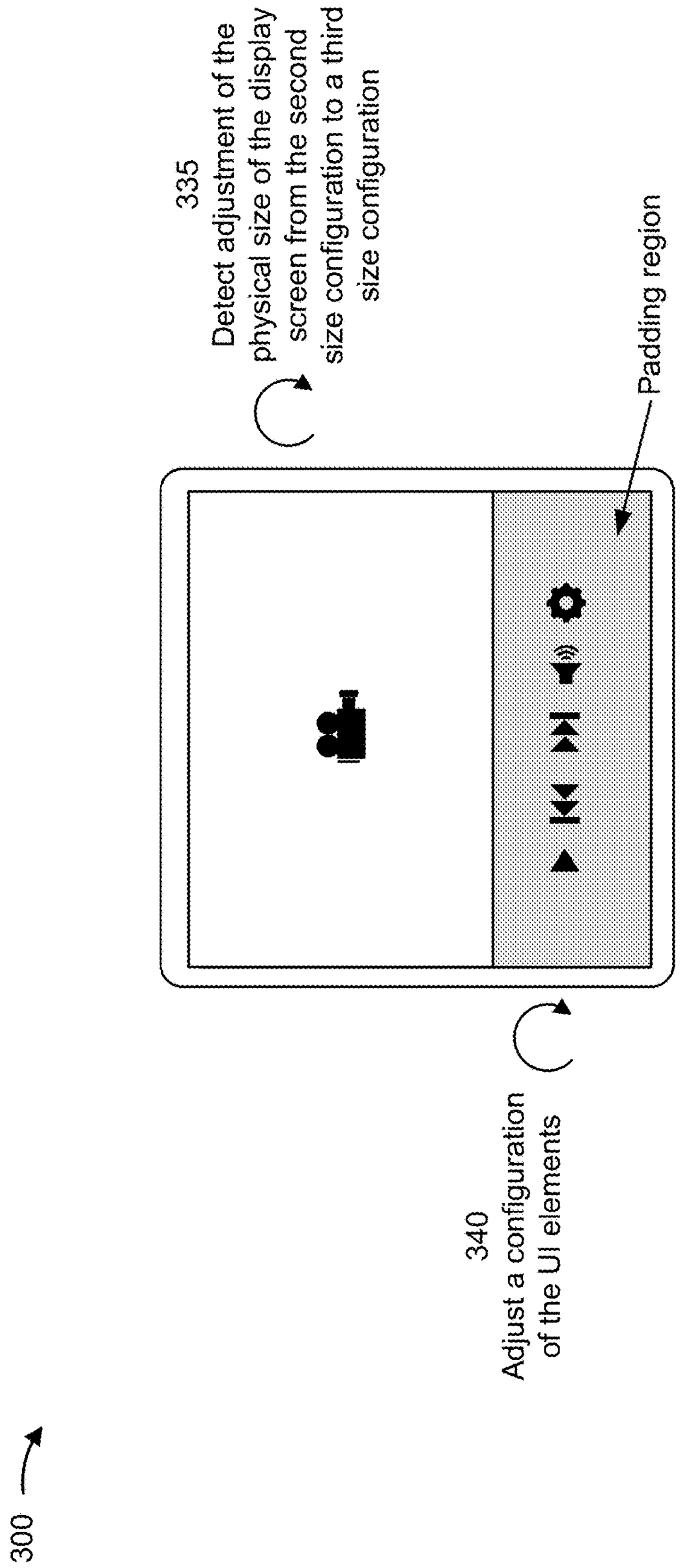

As shown in FIG. 3E, and by reference number 335, the device may detect adjustment of the physical size of the display screen from the second size configuration to the third size configuration having the third display aspect ratio. In a similar manner as described in connection with FIG. 3B, the adjustment of the physical size of the display screen may cause a change to an area (length×width) or an aspect ratio of the display screen. For example, in the case of a rollable display, adjustment of the physical size of the display screen may include partially or fully rolling or unrolling of the rollable display. In some aspects, the physical size of the display screen may be smaller in the third size configuration than in the second size configuration. In some aspects, the physical size of the display screen may be larger in the third size configuration than in the second size configuration. In some aspects, the aspect ratio of the display screen in the third size configuration may be different from the aspect ratio of the display screen in the second size configuration, and may be the same as, or different from, the aspect ratio of the display screen in the first size configuration.

In some aspects, adjustment of the physical size of the display screen from the second size configuration to the third size configuration may result in a change to the contiguous area (length×width) of the padding region. For example, adjustment of the physical size of the display screen from the second size configuration to the third size configuration may result in a decrease to the contiguous area of the padding region. As an example, the padding region as shown in FIG. 3D may decrease in area by an amount that is folded or rolled of the physical screen area of the display screen.

As shown by reference number 340, the device may adjust a configuration of the UI elements. In some aspects, the configuration of the UI elements may relate to a quantity of the UI elements, a size of the UI elements, a location of the UI elements on the display screen, or an arrangement of the UI elements with respect to each other. For example, adjustment of the configuration of the UI elements may result in elimination of one or more UI elements, such as the text input element for submitting a comment, as shown. For example, adjustment of the configuration of the UI elements may result in a change in the location of UI elements, such as the video playback control, volume control, or the like, which are centrally located in the decreased contiguous area of the changed padding region, as shown.

In this way, the user interface of the display screen may be adapted responsive to adjustment of the physical size of the display screen. Accordingly, the user interface may be improved, thereby improving a usability of the device, a user-friendliness of the device, an efficiency of the device, a performance of the device, or the like.

As indicated above, FIGS. 3A-3E are provided as an example. Other examples may differ from what is described with respect to FIGS. 3A-3E.

Figure 4:
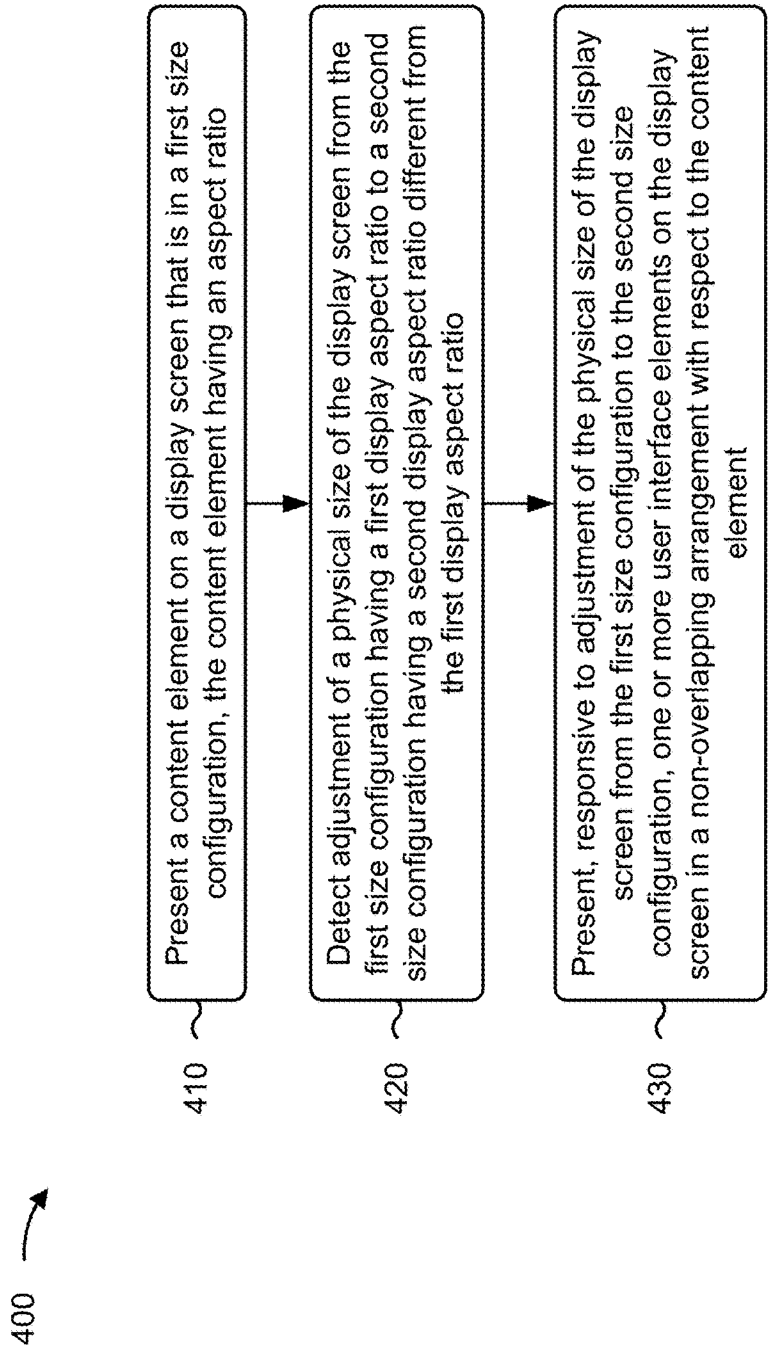
FIG. 4 is a flowchart of an example process associated with adapting a user interface responsive to screen size adjustment.

FIG. 4 is a flowchart of an example process 400 associated with adapting a user interface responsive to screen size adjustment. In some aspects, one or more process blocks of FIG. 4 are performed by a user device (e.g., user device 110). In some aspects, one or more process blocks of FIG. 4 are performed by another device or a group of devices separate from or including the device, such as a communication device (e.g., communication device 120). Additionally, or alternatively, one or more process blocks of FIG. 4 may be performed by one or more components of device 200, such as processor 210, memory 215, storage component 220, input component 225, output component 230, communication interface 235, and/or sensor 240.

As shown in FIG. 4, process 400 may include presenting a content element on a display screen that is in a first size configuration, the content element having an aspect ratio (block 410). For example, the user device may present a content element on a display screen that is in a first size configuration, the content element having an aspect ratio, as described above.

As further shown in FIG. 4, process 400 may include detecting adjustment of a physical size of the display screen from the first size configuration having a first display aspect ratio to a second size configuration having a second display aspect ratio different from the first display aspect ratio (block 420). For example, the user device may detect adjustment of a physical size of the display screen from the first size configuration having a first display aspect ratio to a second size configuration having a second display aspect ratio different from the first display aspect ratio, as described above.

As further shown in FIG. 4, process 400 may include presenting, responsive to adjustment of the physical size of the display screen from the first size configuration to the second size configuration, one or more user interface elements on the display screen in a non-overlapping arrangement with respect to the content element (block 430). For example, the user device may present, responsive to adjustment of the physical size of the display screen from the first size configuration to the second size configuration, one or more user interface elements on the display screen in a non-overlapping arrangement with respect to the content element, as described above.

Process 400 may include additional aspects, such as any single aspect or any combination of aspects described below and/or in connection with one or more other processes described elsewhere herein.

In a first aspect, the content element is video content.

In a second aspect, alone or in combination with the first aspect, adjustment of the physical size of the display screen from the first size configuration to the second size configuration changes a contiguous area of a padding region that borders the content element, and the one or more user interface elements are overlaid on the padding region that borders the content element.

In a third aspect, alone or in combination with one or more of the first and second aspects, process 400 includes detecting adjustment of the physical size of the display screen from the second size configuration to a third size configuration, and adjusting, responsive to adjustment of the physical size of the display screen from the second size configuration to the third size configuration, a configuration of the one or more user interface elements.

In a fourth aspect, alone or in combination with one or more of the first through third aspects, the configuration of the one or more user interface elements relates to a quantity of the one or more user interface elements, a size of the one or more user interface elements, a location of the one or more user interface elements on the display screen, or an arrangement of the one or more user interface elements with respect to each other.

In a fifth aspect, alone or in combination with one or more of the first through fourth aspects, process 400 includes adjusting a location of the content element on the display screen, where the one or more user interface elements on the display screen are presented in the non-overlapping arrangement with respect to an adjusted location of the content element.

In a sixth aspect, alone or in combination with one or more of the first through fifth aspects, process 400 includes determining that the aspect ratio of the content element and the second display aspect ratio differ, and presenting the one or more user interface elements on the display screen in the non-overlapping arrangement with respect to the content element is further responsive to determining that the aspect ratio of the content element and the second display aspect ratio differ.

In a seventh aspect, alone or in combination with one or more of the first through sixth aspects, the display screen is a rollable display or a foldable display configured for adjustment of the physical size of the display screen.

In an eighth aspect, alone or in combination with one or more of the first through seventh aspects, presenting the one or more user interface elements on the display screen in the non-overlapping arrangement with respect to the content element is further responsive to one or more user preferences.

Although FIG. 4 shows example blocks of process 400, in some aspects, process 400 includes additional blocks, fewer blocks, different blocks, or differently arranged blocks than those depicted in FIG. 4. Additionally, or alternatively, two or more of the blocks of process 400 may be performed in parallel.

Figure 5:
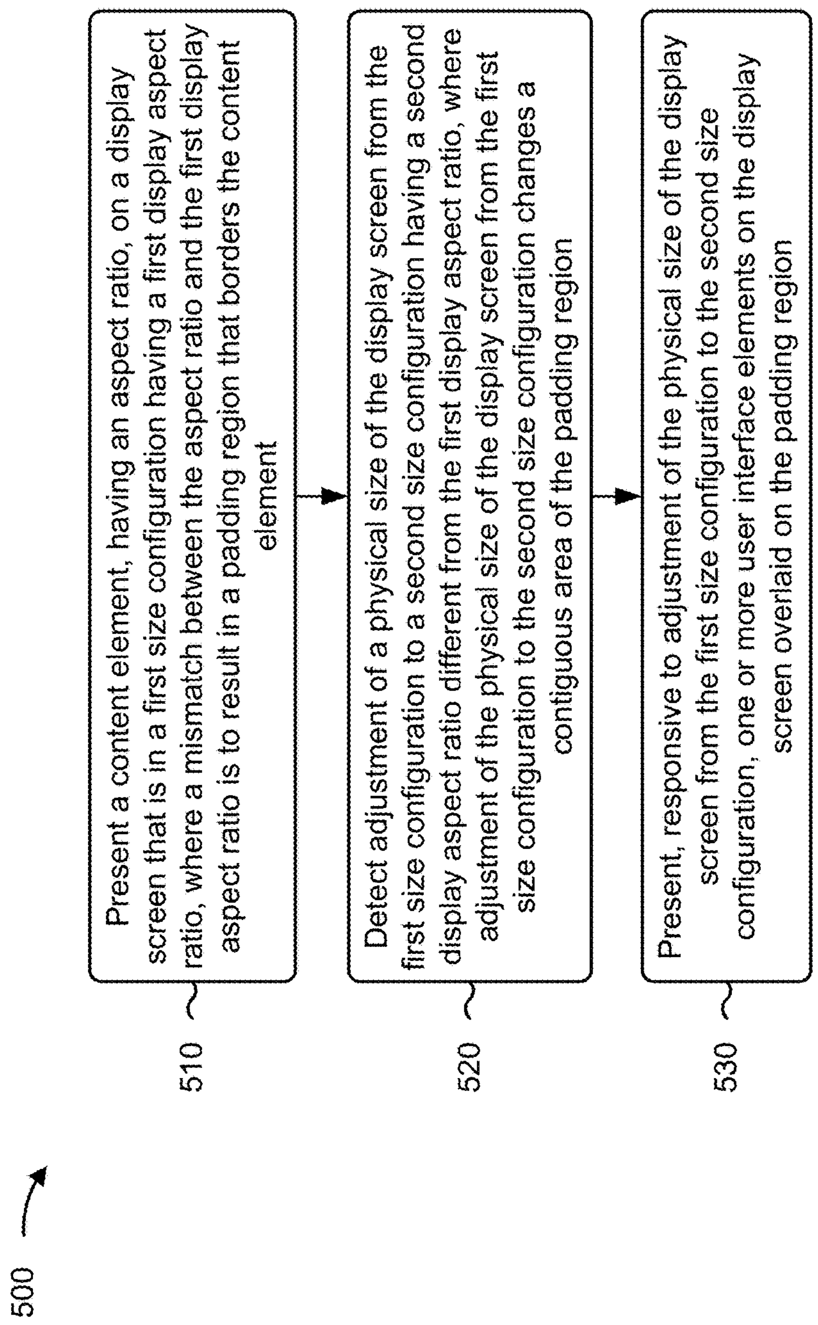
FIG. 5 is a flowchart of an example process associated with adapting a user interface responsive to screen size adjustment.

FIG. 5 is a flowchart of an example process 500 associated with adapting a user interface responsive to screen size adjustment. In some aspects, one or more process blocks of FIG. 5 are performed by a user device (e.g., user device 110). In some aspects, one or more process blocks of FIG. 5 are performed by another device or a group of devices separate from or including the device, such as a communication device (e.g., communication device 120). Additionally, or alternatively, one or more process blocks of FIG. 5 may be performed by one or more components of device 200, such as processor 210, memory 215, storage component 220, input component 225, output component 230, communication interface 235, and/or sensor 240.

As shown in FIG. 5, process 500 may include presenting a content element, having an aspect ratio, on a display screen that is in a first size configuration having a first display aspect ratio, where a mismatch between the aspect ratio and the first display aspect ratio is to result in a padding region that borders the content element (block 510). For example, the user device may present a content element, having an aspect ratio, on a display screen that is in a first size configuration having a first display aspect ratio, as described above. In some aspects, a mismatch between the aspect ratio and the first display aspect ratio is to result in a padding region that borders the content element.

As further shown in FIG. 5, process 500 may include detecting adjustment of a physical size of the display screen from the first size configuration to a second size configuration having a second display aspect ratio different from the first display aspect ratio, where adjustment of the physical size of the display screen from the first size configuration to the second size configuration changes a contiguous area of the padding region (block 520). For example, the user device may detect adjustment of a physical size of the display screen from the first size configuration to a second size configuration having a second display aspect ratio different from the first display aspect ratio, as described above. In some aspects, adjustment of the physical size of the display screen from the first size configuration to the second size configuration changes a contiguous area of the padding region.

As further shown in FIG. 5, process 500 may include presenting, responsive to adjustment of the physical size of the display screen from the first size configuration to the second size configuration, one or more user interface elements on the display screen overlaid on the padding region (block 530). For example, the user device may present, responsive to adjustment of the physical size of the display screen from the first size configuration to the second size configuration, one or more user interface elements on the display screen overlaid on the padding region, as described above.

Process 500 may include additional aspects, such as any single aspect or any combination of aspects described below and/or in connection with one or more other processes described elsewhere herein.

In a first aspect, the content element is video content.

In a second aspect, alone or in combination with the first aspect, adjustment of the physical size of the display screen from the first size configuration to a second size configuration increases the contiguous area of the padding region.

In a third aspect, alone or in combination with one or more of the first and second aspects, process 500 includes detecting adjustment of the physical size of the display screen from the second size configuration to a third size configuration, and adjusting, responsive to adjustment of the physical size of the display screen from the second size configuration to the third size configuration, a configuration of the one or more user interface elements.

In a fourth aspect, alone or in combination with one or more of the first through third aspects, the configuration of the one or more user interface elements relates to a quantity of the one or more user interface elements, a size of the one or more user interface elements, a location of the one or more user interface elements on the display screen, or an arrangement of the one or more user interface elements with respect to each other.

In a fifth aspect, alone or in combination with one or more of the first through fourth aspects, process 500 includes adjusting a location of the content element on the display screen, where the contiguous area of the padding region after adjustment of the location of the content element is greater than the contiguous area of the padding region prior to adjustment of the location of the content element, and the one or more user interface elements are overlaid on the padding region with respect to an adjusted location of the content element.

In a sixth aspect, alone or in combination with one or more of the first through fifth aspects, the display screen is a rollable display or a foldable display configured for adjustment of the physical size of the display screen.

In a seventh aspect, alone or in combination with one or more of the first through sixth aspects, the one or more user interface elements include one or more of text, a user control, a text input element, an interactive element, or an additional content element.

Although FIG. 5 shows example blocks of process 500, in some aspects, process 500 includes additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 associated with adapting a user interface responsive to screen size adjustment. In some aspects, one or more process blocks of FIG. 6 are performed by a user device (e.g., user device 110). In some aspects, one or more process blocks of FIG. 6 are performed by another device or a group of devices separate from or including the device, such as a communication device (e.g., communication device 120). Additionally, or alternatively, one or more process blocks of FIG. 6 may be performed by one or more components of device 200, such as processor 210, memory 215, storage component 220, input component 225, output component 230, communication interface 235, and/or sensor 240.

As shown in FIG. 6, process 600 may include presenting a content element, having an aspect ratio, on a display screen in a first size configuration having a first display aspect ratio, where a mismatch between the aspect ratio and the first display aspect ratio is to result in a padding region that borders the content element (block 610). For example, the user device may present a content element, having an aspect ratio, on a display screen in a first size configuration having a first display aspect ratio, as described above. In some aspects, a mismatch between the aspect ratio and the first display aspect ratio is to result in a padding region that borders the content element.

As further shown in FIG. 6, process 600 may include detecting adjustment of a physical size of the display screen from the first size configuration to a second size configuration having a second display aspect ratio different from the first display aspect ratio (block 620). For example, the user device may detect adjustment of a physical size of the display screen from the first size configuration to a second size configuration having a second display aspect ratio different from the first display aspect ratio, as described above.

As further shown in FIG. 6, process 600 may include identifying, responsive to adjustment of the physical size of the display screen from the first size configuration to the second size configuration, a contiguous area of the padding region that borders the content element (block 630). For example, the user device may identify, responsive to adjustment of the physical size of the display screen from the first size configuration to the second size configuration, a contiguous area of the padding region that borders the content element, as described above.

As further shown in FIG. 6, process 600 may include adjusting a location of the content element on the display screen responsive to the contiguous area of the padding region being insufficient to contain one or more user interface elements, where the contiguous area of the padding region after adjustment of the location of the content element is greater than the contiguous area of the padding region prior to adjustment of the location of the content element (block 640). For example, the user device may adjust a location of the content element on the display screen responsive to a contiguous area of the padding region being insufficient to contain one or more user interface elements, as described above. In some aspects, the contiguous area of the padding region after adjustment of the location of the content element is greater than the contiguous area of the padding region prior to adjustment of the location of the content element.

As further shown in FIG. 6, process 600 may include presenting, on the display screen in the second size configuration and responsive to adjustment of the location of the content element, the one or more user interface elements overlaid on the padding region (block 650). For example, the user device may present, on the display screen in the second size configuration and responsive to adjustment of the location of the content element, the one or more user interface elements overlaid on the padding region, as described above.

Process 600 may include additional aspects, such as any single aspect or any combination of aspects described below and/or in connection with one or more other processes described elsewhere herein.

In a first aspect, the content element is video content.

In a second aspect, alone or in combination with the first aspect, process 600 includes detecting adjustment of the physical size of the display screen from the second size configuration to a third size configuration, and adjusting, responsive to adjustment of the physical size of the display screen from the second size configuration to the third size configuration, a configuration of the one or more user interface elements.

In a third aspect, alone or in combination with one or more of the first and second aspects, the configuration of the one or more user interface elements relates to a quantity of the one or more user interface elements, a size of the one or more user interface elements, a location of the one or more user interface elements on the display screen, or an arrangement of the one or more user interface elements with respect to each other.

In a fourth aspect, alone or in combination with one or more of the first through third aspects, the display screen is a rollable display or a foldable display configured for adjustment of the physical size of the display screen.

In a fifth aspect, alone or in combination with one or more of the first through fourth aspects, process 600 includes identifying the contiguous area of the padding region according to the aspect ratio of the content element, the second display aspect ratio of the display screen, and a total area of the display screen.

In a sixth aspect, alone or in combination with one or more of the first through fifth aspects, the one or more user interface elements include one or more of text, a user control, a text input element, an interactive element, or an additional content element.

In a seventh aspect, alone or in combination with one or more of the first through sixth aspects, prior to adjustment of the location of the content element, the padding region and an additional padding region border opposite edges of the content element, and after adjustment of the location of the content element the padding region is a single padding region bordering a single edge of the content element.

Although FIG. 6 shows example blocks of process 600, in some aspects, process 600 includes additional blocks, fewer blocks, different blocks, or differently arranged blocks than those depicted in FIG. 6. Additionally, or alternatively, two or more of the blocks of process 600 may be performed in parallel.

Figure 7:
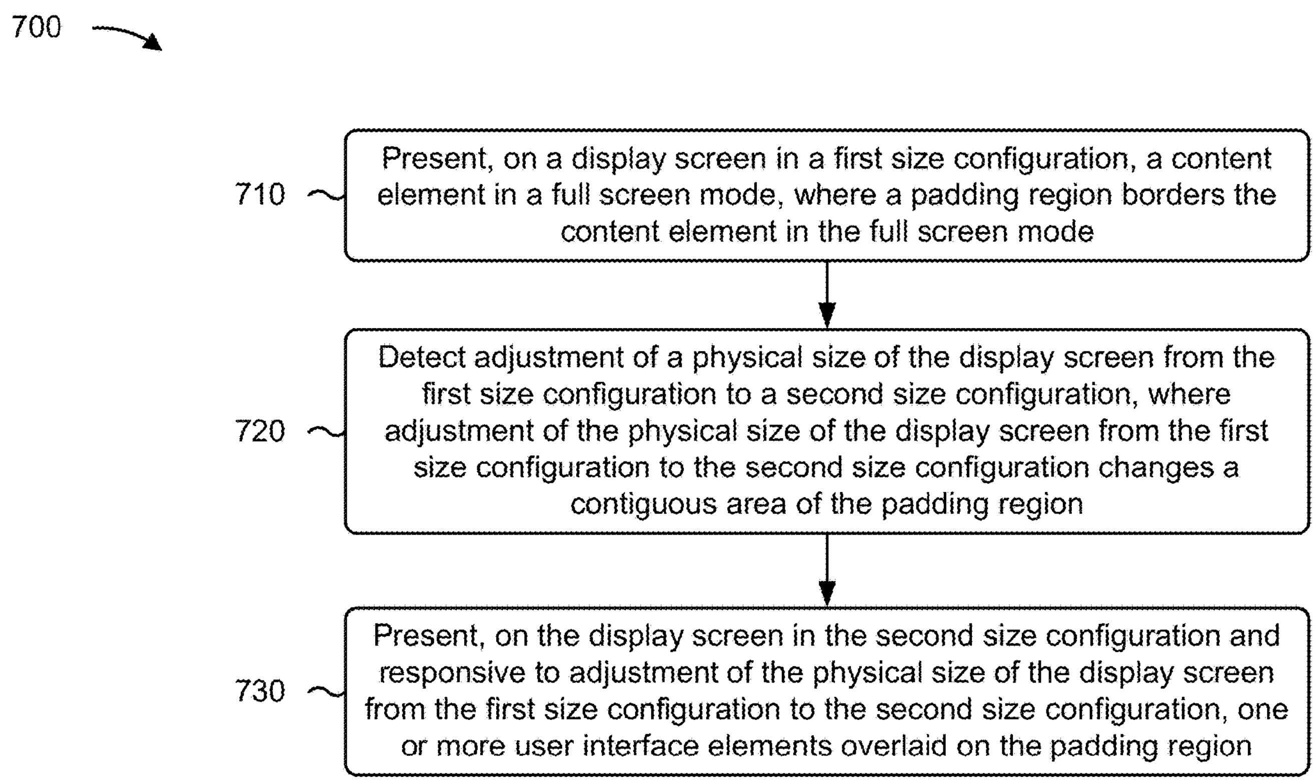
FIG. 7 is a flowchart of an example process associated with adapting a user interface responsive to screen size adjustment.

FIG. 7 is a flowchart of an example process 700 associated with adapting a user interface responsive to screen size adjustment. In some aspects, one or more process blocks of FIG. 7 are performed by a user device (e.g., user device 110). In some aspects, one or more process blocks of FIG. 7 are performed by another device or a group of devices separate from or including the user device, such as a communication device (e.g., communication device 120). Additionally, or alternatively, one or more process blocks of FIG. 7 may be performed by one or more components of device 200, such as processor 210, memory 215, storage component 220, input component 225, output component 230, communication interface 235, and/or sensor 240.

As shown in FIG. 7, process 700 may include presenting, on a display screen in a first size configuration, a content element in a full screen mode, where a padding region borders the content element in the full screen mode (block 710). For example, the user device may present, on a display screen in a first size configuration, a content element in a full screen mode, as described above. In some aspects, a padding region borders the content element in the full screen mode.

As further shown in FIG. 7, process 700 may include detecting adjustment of a physical size of the display screen from the first size configuration to a second size configuration, where adjustment of the physical size of the display screen from the first size configuration to the second size configuration changes a contiguous area of the padding region (block 720). For example, the user device may detect adjustment of a physical size of the display screen from the first size configuration to a second size configuration, as described above. In some aspects, adjustment of the physical size of the display screen from the first size configuration to the second size configuration changes a contiguous area of the padding region.

As further shown in FIG. 7, process 700 may include presenting, on the display screen in the second size configuration and responsive to adjustment of the physical size of the display screen from the first size configuration to the second size configuration, one or more user interface elements overlaid on the padding region (block 730). For example, the user device may present, on the display screen in the second size configuration and responsive to adjustment of the physical size of the display screen from the first size configuration to the second size configuration, one or more user interface elements overlaid on the padding region, as described above.

Process 700 may include additional aspects, such as any single aspect or any combination of aspects described below and/or in connection with one or more other processes described elsewhere herein.

In a first aspect, user interface elements are absent from the padding region in the first size configuration of the display screen.

In a second aspect, alone or in combination with the first aspect, a configuration of user interface elements in the padding region in the first size configuration of the display screen is different from a configuration of the one or more user interface elements overlaid on the padding region in the second size configuration of the display screen.

In a third aspect, alone or in combination with one or more of the first and second aspects, process 700 includes adjusting a location of the content element on the display screen, where the contiguous area of the padding region after adjustment of the location of the content element is greater than the contiguous area of the padding region prior to adjustment of the location of the content element, and the one or more user interface elements are overlaid on the padding region with respect to an adjusted location of the content element.

In a fourth aspect, alone or in combination with one or more of the first through third aspects, the display screen is a rollable display or a foldable display configured for adjustment of the physical size of the display screen.

Although FIG. 7 shows example blocks of process 700, in some aspects, process 700 includes additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method, comprising: presenting, by a device, a content element on a display screen that is in a first size configuration, the content element having an aspect ratio; detecting, by the device, adjustment of a physical size of the display screen from the first size configuration having a first display aspect ratio to a second size configuration having a second display aspect ratio different from the first display aspect ratio; and presenting, by the device and responsive to adjustment of the physical size of the display screen from the first size configuration to the second size configuration, one or more user interface elements on the display screen in a non-overlapping arrangement with respect to the content element.

Aspect 2: The method of Aspect 1, wherein the content element is video content.

Aspect 3: The method of any of Aspects 1-2, wherein adjustment of the physical size of the display screen from the first size configuration to the second size configuration changes a contiguous area of a padding region that borders the content element, and wherein the one or more user interface elements are overlaid on the padding region that borders the content element. wherein the one or more user interface elements are overlaid on the padding region that borders the content element.

Aspect 4: The method of any of Aspects 1-3, further comprising: detecting adjustment of the physical size of the display screen from the second size configuration to a third size configuration; and adjusting, responsive to adjustment of the physical size of the display screen from the second size configuration to the third size configuration, a configuration of the one or more user interface elements.

Aspect 5: The method of Aspect 4, wherein the configuration of the one or more user interface elements relates to a quantity of the one or more user interface elements, a size of the one or more user interface elements, a location of the one or more user interface elements on the display screen, or an arrangement of the one or more user interface elements with respect to each other.

Aspect 6: The method of any of Aspects 1-5, further comprising: adjusting a location of the content element on the display screen, wherein the one or more user interface elements on the display screen are presented in the non-overlapping arrangement with respect to an adjusted location of the content element.

Aspect 7: The method of any of Aspects 1-6, further comprising: determining that the aspect ratio of the content element and the second display aspect ratio differ, wherein presenting the one or more user interface elements on the display screen in the non-overlapping arrangement with respect to the content element is further responsive to determining that the aspect ratio of the content element and the second display aspect ratio differ.

Aspect 8: The method of any of Aspects 1-7, wherein the display screen is a rollable display or a foldable display configured for adjustment of the physical size of the display screen.

Aspect 9: The method of any of Aspects 1-8, wherein presenting the one or more user interface elements on the display screen in the non-overlapping arrangement with respect to the content element is further responsive to one or more user preferences.

Aspect 10: A system, comprising: one or more memories; and one or more processors, coupled to the one or more memories, configured to: present a content element, having an aspect ratio, on a display screen that is in a first size configuration having a first display aspect ratio, wherein a mismatch between the aspect ratio and the first display aspect ratio is to result in a padding region that borders the content element; detect adjustment of a physical size of the display screen from the first size configuration to a second size configuration having a second display aspect ratio different from the first display aspect ratio, wherein adjustment of the physical size of the display screen from the first size configuration to the second size configuration changes a contiguous area of the padding region; and present, responsive to adjustment of the physical size of the display screen from the first size configuration to the second size configuration, one or more user interface elements on the display screen overlaid on the padding region.

Aspect 11: The system of Aspect 10, wherein the content element is video content.

Aspect 12: The system of any of Aspects 10-11, wherein adjustment of the physical size of the display screen from the first size configuration to a second size configuration increases the contiguous area of the padding region.

Aspect 13: The system of any of Aspects 10-12, wherein the one or more processors are further configured to: detect adjustment of the physical size of the display screen from the second size configuration to a third size configuration; and adjust, responsive to adjustment of the physical size of the display screen from the second size configuration to the third size configuration, a configuration of the one or more user interface elements.

Aspect 14: The system of Aspect 13, wherein the configuration of the one or more user interface elements relates to a quantity of the one or more user interface elements, a size of the one or more user interface elements, a location of the one or more user interface elements on the display screen, or an arrangement of the one or more user interface elements with respect to each other.

Aspect 15: The system of any of Aspects 10-14, wherein the one or more processors are further configured to: adjust a location of the content element on the display screen, wherein the contiguous area of the padding region after adjustment of the location of the content element is greater than the contiguous area of the padding region prior to adjustment of the location of the content element, and wherein the one or more user interface elements are overlaid on the padding region with respect to an adjusted location of the content element.

Aspect 16: The system of any of Aspects 10-15, wherein the display screen is a rollable display or a foldable display configured for adjustment of the physical size of the display screen.

Aspect 17: The system of any of Aspects 10-16, wherein the one or more user interface elements include one or more of: text, a user control, a text input element, an interactive element, or an additional content element. text, a user control, a text input element, an interactive element, or an additional content element.

Aspect 18: A non-transitory computer-readable medium storing a set of instructions, the set of instructions comprising: one or more instructions that, when executed by one or more processors of a device, cause the device to: present a content element, having an aspect ratio, on a display screen in a first size configuration having a first display aspect ratio, wherein a mismatch between the aspect ratio and the first display aspect ratio is to result in a padding region that borders the content element; detect adjustment of a physical size of the display screen from the first size configuration to a second size configuration having a second display aspect ratio different from the first display aspect ratio; identify, responsive to adjustment of the physical size of the display screen from the first size configuration to the second size configuration, a contiguous area of the padding region that borders the content element; adjust a location of the content element on the display screen responsive to the contiguous area of the padding region being insufficient to contain one or more user interface elements, wherein the contiguous area of the padding region after adjustment of the location of the content element is greater than the contiguous area of the padding region prior to adjustment of the location of the content element; and present, on the display screen in the second size configuration and responsive to adjustment of the location of the content element, the one or more user interface elements overlaid on the padding region.

Aspect 19: The non-transitory computer-readable medium of Aspect 18, wherein the content element is video content.

Aspect 20: The non-transitory computer-readable medium of any of Aspects 18-19, wherein the one or more instructions, when executed by the one or more processors, further cause the device to: detect adjustment of the physical size of the display screen from the second size configuration to a third size configuration; and adjust, responsive to adjustment of the physical size of the display screen from the second size configuration to the third size configuration, a configuration of the one or more user interface elements.

Aspect 21: The non-transitory computer-readable medium of Aspect 20, wherein the configuration of the one or more user interface elements relates to a quantity of the one or more user interface elements, a size of the one or more user interface elements, a location of the one or more user interface elements on the display screen, or an arrangement of the one or more user interface elements with respect to each other.

Aspect 22: The non-transitory computer-readable medium of any of Aspects 18-21, wherein the display screen is a rollable display or a foldable display configured for adjustment of the physical size of the display screen.

Aspect 23: The non-transitory computer-readable medium of any of Aspects 18-22, wherein the one or more instructions, that cause the device to identify the contiguous area of the padding region, cause the device to: identify the contiguous area of the padding region according to the aspect ratio of the content element, the second display aspect ratio of the display screen, and a total area of the display screen.

Aspect 24: The non-transitory computer-readable medium of any of Aspects 18-23, wherein the one or more user interface elements include one or more of: text, a user control, a text input element, an interactive element, or an additional content element. text, a user control, a text input element, an interactive element, or an additional content element.

Aspect 25: The non-transitory computer-readable medium of any of Aspects 18-24, wherein prior to adjustment of the location of the content element the padding region and an additional padding region border opposite edges of the content element, and wherein after adjustment of the location of the content element the padding region is a single padding region bordering a single edge of the content element.

Aspect 26: An apparatus, comprising: means for presenting, on a display screen in a first size configuration, a content element in a full screen mode, wherein a padding region borders the content element in the full screen mode; means for detecting adjustment of a physical size of the display screen from the first size configuration to a second size configuration, wherein adjustment of the physical size of the display screen from the first size configuration to the second size configuration changes a contiguous area of the padding region; and means for presenting, on the display screen in the second size configuration and responsive to adjustment of the physical size of the display screen from the first size configuration to the second size configuration, one or more user interface elements overlaid on the padding region.

Aspect 27: The apparatus of Aspect 26, wherein user interface elements are absent from the padding region in the first size configuration of the display screen.

Aspect 28: The apparatus of any of Aspects 26-27, wherein a configuration of user interface elements in the padding region in the first size configuration of the display screen is different from a configuration of the one or more user interface elements overlaid on the padding region in the second size configuration of the display screen.

Aspect 29: The apparatus of any of Aspects 26-28, further comprising: means for adjusting a location of the content element on the display screen, wherein the contiguous area of the padding region after adjustment of the location of the content element is greater than the contiguous area of the padding region prior to adjustment of the location of the content element, and wherein the one or more user interface elements are overlaid on the padding region with respect to an adjusted location of the content element.

Aspect 30: The apparatus of any of Aspects 26-29, wherein the display screen is a rollable display or a foldable display configured for adjustment of the physical size of the display screen.

Aspect 31: A system configured to perform one or more operations recited in one or more of Aspects 1-9.

Aspect 32: An apparatus comprising means for performing one or more operations recited in one or more of Aspects 1-9.

Aspect 33: A non-transitory computer-readable medium storing a set of instructions, the set of instructions comprising one or more instructions that, when executed by a device, cause the device to perform one or more operations recited in one or more of Aspects 1-9.

Aspect 34: A computer program product comprising instructions or code for executing one or more operations recited in one or more of Aspects 1-9.

Aspect 35: An apparatus comprising means for performing one or more operations recited in one or more of Aspects 10-17.

Aspect 36: A non-transitory computer-readable medium storing a set of instructions, the set of instructions comprising one or more instructions that, when executed by a device, cause the device to perform one or more operations recited in one or more of Aspects 10-17.

Aspect 37: A computer program product comprising instructions or code for executing one or more operations recited in one or more of Aspects 10-17.

Aspect 38: A system configured to perform one or more operations recited in one or more of Aspects 18-25.

Aspect 39: An apparatus comprising means for performing one or more operations recited in one or more of Aspects 18-25.

Aspect 40: A non-transitory computer-readable medium storing a set of instructions, the set of instructions comprising one or more instructions that, when executed by a device, cause the device to perform one or more operations recited in one or more of Aspects 18-25.

Aspect 41: A computer program product comprising instructions or code for executing one or more operations recited in one or more of Aspects 18-25.

Aspect 42: A system configured to perform one or more operations recited in one or more of Aspects 1-30.

Aspect 43: A non-transitory computer-readable medium storing a set of instructions, the set of instructions comprising one or more instructions that, when executed by a device, cause the device to perform one or more operations recited in one or more of Aspects 1-30.

Aspect 44: A computer program product comprising instructions or code for executing one or more operations recited in one or more of Aspects 1-30.

Aspect 45: A method operable on a user device of a type having a display screen a physical size of which is changeable in at least one direction thereby changing an aspect ratio of the display screen, comprising: presenting, by the user device, video content on the display screen that is in a first size configuration, the video content having a video aspect ratio; detecting, by the user device, adjustment of a physical size of the display screen in the at least one direction from the first size configuration having a first display aspect ratio to a second size configuration having a second display aspect ratio; determining that the video aspect ratio and second display aspect ratio differ; and presenting, by the user device and responsive to determining that the video aspect ratio and second display aspect ratio differ, and responsive to one or more user preferences, one or more user interface elements on the display screen in a non-overlapping arrangement with respect to the video content.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

presenting, by a device, a content element on a display screen that is in a first size configuration, the content element having an aspect ratio;

detecting, by the device, an adjustment of a physical size of the display screen from the first size configuration, having a first display aspect ratio and a first area, to a second size configuration having a second display aspect ratio, different from the first display aspect ratio, and a second area different from the first area;

adjusting, after detecting the adjustment of the physical size of the display screen from the first size configuration to the second size configuration, a location of the content element on the display screen; and presenting, by the device and after adjusting the location of the content element on the display screen, one or more user interface elements on the display screen in a non-overlapping arrangement with respect to the content element, wherein, after adjusting the location of the content element on the display screen, the display screen transitions from presenting the content element without any user interface elements to presenting the one or more user interface elements on the display screen.

2. The method of claim 1, wherein the content element is video content.

3. The method of claim 1, wherein the adjustment of the physical size of the display screen from the first size configuration to the second size configuration changes a contiguous area of a padding region that borders the content element, and wherein the one or more user interface elements are overlaid on the padding region that borders the content element.

4. The method of claim 1, further comprising:

detecting an adjustment of the physical size of the display screen from the second size configuration to a third size configuration; and adjusting, responsive to the adjustment of the physical size of the display screen from the second size configuration to the third size configuration, a configuration of the one or more user interface elements.

5. The method of claim 4, wherein the configuration of the one or more user interface elements relates to a quantity of the one or more user interface elements, a size of the one or more user interface elements, a location of the one or more user interface elements on the display screen, or an arrangement of the one or more user interface elements with respect to each other.

6. The method of claim 1, further comprising:

determining that the aspect ratio of the content element and the second display aspect ratio differ, wherein presenting the one or more user interface elements on the display screen in the non-overlapping arrangement with respect to the content element is further responsive to determining that the aspect ratio of the content element and the second display aspect ratio differ.

7. The method of claim 1, wherein the display screen is a rollable display or a foldable display configured for the adjustment of the physical size of the display screen.

8. The method of claim 1, wherein presenting the one or more user interface elements on the display screen in the non-overlapping arrangement with respect to the content element is further responsive to one or more user preferences.

9. The method of claim 8, wherein the one or more user preferences comprises at least one of:

a user interface (UI) element display preference, or a UI element hiding preference.

10. The method of claim 1, wherein presenting the one or more user interface elements in the non-overlapping arrangement with respect to the content element comprises:

presenting the one or more user interface elements in the non-overlapping arrangement that is in accordance with one or more user characteristics.

11. The method of claim 10, wherein the one or more user characteristics comprises at least one of:

a dominant hand of a user of the device, a hand size of the user, an age of the user, or a vision impairment of the user.

12. A system, comprising:

one or more memories; and one or more processors, coupled to the one or more memories, configured to:

present a content element, having an aspect ratio, on a display screen that is in a first size configuration having a first display aspect ratio, wherein a mismatch between the aspect ratio and the first display aspect ratio is to result in a padding region that borders the content element;

detect an adjustment of a physical size of the display screen from the first size configuration, having a first area, to a second size configuration having a second display aspect ratio, different from the first display aspect ratio, having a second area different from the first area, wherein the adjustment of the physical size of the display screen from the first size configuration to the second size configuration changes a contiguous area of the padding region;

adjust, after detecting the adjustment of the physical size of the display screen from the first size configuration to the second size configuration, a location of the content element on the display screen; and present, after adjusting the location of the content element on the display screen, one or more user interface elements on the display screen overlaid on the padding region, wherein, after adjusting the location of the content element on the display screen, the display screen transitions from presenting the content element without any user interface elements to presenting the one or more user interface elements on the display screen.

13. The system of claim 12, wherein the content element is video content.

14. The system of claim 12, wherein the adjustment of the physical size of the display screen from the first size configuration to the second size configuration increases the contiguous area of the padding region.

15. The system of claim 12, wherein the one or more processors are further configured to:

detect an adjustment of the physical size of the display screen from the second size configuration to a third size configuration; and adjust, responsive to the adjustment of the physical size of the display screen from the second size configuration to the third size configuration, a configuration of the one or more user interface elements.

16. The system of claim 15, wherein the configuration of the one or more user interface elements relates to a quantity of the one or more user interface elements, a size of the one or more user interface elements, a location of the one or more user interface elements on the display screen, or an arrangement of the one or more user interface elements with respect to each other.

17. The system of claim 12, wherein the one or more processors are further configured to:

adjust a location of the content element on the display screen, wherein the contiguous area of the padding region after adjusting the location of the content element is greater than the contiguous area of the padding region prior to adjusting the location of the content element.

18. The system of claim 12, wherein the display screen is a rollable display or a foldable display configured for the adjustment of the physical size of the display screen.

19. The system of claim 12, wherein the one or more user interface elements include one or more of:

text, a user control, a text input element, an interactive element, or an additional content element.

20. A non-transitory computer-readable medium storing a set of instructions, the set of instructions comprising:

one or more instructions that, when executed by one or more processors of a device, cause the device to:

present a content element, having an aspect ratio, on a display screen in a first size configuration having a first display aspect ratio, wherein a mismatch between the aspect ratio and the first display aspect ratio is to result in a padding region that borders the content element;

detect an adjustment of a physical size of the display screen from the first size configuration, having a first area, to a second size configuration having a second display aspect ratio, different from the first display aspect ratio, and a second area different from the first area;

identify, responsive to the adjustment of the physical size of the display screen from the first size configuration to the second size configuration, a contiguous area of the padding region that borders the content element;

adjust a location of the content element on the display screen responsive to the contiguous area of the padding region being insufficient to contain one or more user interface elements, wherein the contiguous area of the padding region after adjusting the location of the content element is greater than the contiguous area of the padding region prior to adjusting the location of the content element; and present, on the display screen in the second size configuration and after adjusting the location of the content element on the display screen, the one or more user interface elements overlaid on the padding region, wherein, after adjusting the location of the content element on the display screen, the display screen transitions from presenting the content element without any user interface elements to presenting the one or more user interface elements.

21. The non-transitory computer-readable medium of claim 20, wherein the content element is video content.

22. The non-transitory computer-readable medium of claim 20, wherein the one or more instructions, when executed by the one or more processors, further cause the device to:

detect an adjustment of the physical size of the display screen from the second size configuration to a third size configuration; and adjust, responsive to the adjustment of the physical size of the display screen from the second size configuration to the third size configuration, a configuration of the one or more user interface elements.

23. The non-transitory computer-readable medium of claim 22, wherein the configuration of the one or more user interface elements relates to a quantity of the one or more user interface elements, a size of the one or more user interface elements, a location of the one or more user interface elements on the display screen, or an arrangement of the one or more user interface elements with respect to each other.

24. The non-transitory computer-readable medium of claim 20, wherein the display screen is a rollable display or a foldable display configured for the adjustment of the physical size of the display screen.

25. The non-transitory computer-readable medium of claim 20, wherein the one or more instructions, that cause the device to identify the contiguous area of the padding region, cause the device to:

identify the contiguous area of the padding region according to the aspect ratio of the content element, the second display aspect ratio of the display screen, and a total area of the display screen.

26. The non-transitory computer-readable medium of claim 20, wherein the one or more user interface elements include one or more of:

text, a user control, a text input element, an interactive element, or an additional content element.

27. The non-transitory computer-readable medium of claim 20, wherein prior to the adjustment of the location of the content element the padding region and an additional padding region border opposite edges of the content element, and wherein after the adjustment of the location of the content element the padding region is a single padding region bordering a single edge of the content element.

28. An apparatus, comprising:

means for presenting, on a display screen in a first size configuration, a content element in a full screen mode, wherein a padding region borders the content element in the full screen mode;

means for detecting an adjustment of a physical size of the display screen from the first size configuration having a first area to a second size configuration having a second area different form the first area, wherein the adjustment of the physical size of the display screen from the first size configuration to the second size configuration changes a contiguous area of the padding region;

means for adjusting, after detecting an adjustment of the physical size of the display screen, a location of the content element on the display screen; and means for presenting, on the display screen in the second size configuration and after adjusting the location of the content element on the display screen, one or more user interface elements on the padding region, wherein, after adjusting the location of the content element on the display screen, the display screen transitions from presenting the content element without any user interface elements to presenting the one or more user interface elements on the padding region.

29. The apparatus of claim 28, further comprising:

wherein the contiguous area of the padding region after the adjustment of the location of the content element is greater than the contiguous area of the padding region prior to the adjustment of the location of the content element.

30. The apparatus of claim 28, wherein the display screen is a rollable display or a foldable display configured for the adjustment of the physical size of the display screen.

* * * * *